US005955695A

United States Patent [19]

McNulty, Sr.

[11] Patent Number: 5,955,695

[45] Date of Patent: *Sep. 21, 1999

[54] AUTOMATIC AIMING NON-LETHAL AREA DENIAL DEVICE

[75] Inventor: James F. McNulty, Sr., Anaheim, Calif.

[73] Assignee: Barnet Resnick, Newport Beach, Calif.

[ * ] Notice: This patent is subject to a terminal disclaimer.

[21] Appl. No.: 09/059,028

[22] Filed: Apr. 13, 1998

Related U.S. Application Data

[63] Continuation-in-part of application No. 08/991,268, Dec. 16, 1997.

[51] Int. Cl.[6] .............................. B64D 1/04; F42C 22/02; H01G 23/00

[52] U.S. Cl. ........................... 89/1.11; 102/426; 102/427; 361/232

[58] Field of Search .................................... 89/1.11, 1.34; 102/427, 428, 426, 424, 404; 361/232

[56] References Cited

U.S. PATENT DOCUMENTS

| | | | |
|---|---|---|---|
| 3,523,538 | 8/1970 | Shimizu | 89/1.11 |
| 3,803,463 | 4/1974 | Cover | 89/1.11 |
| 4,712,479 | 12/1987 | Babel | 102/427 |
| 5,345,874 | 9/1994 | Lemonnier et al. | 102/424 |
| 5,473,501 | 12/1995 | Claypool | 89/1.11 |
| 5,654,867 | 8/1997 | Murray | 361/232 |
| 5,675,103 | 10/1997 | Herr | 89/1.11 |
| 5,786,546 | 7/1998 | Simson | 89/1.11 |

*Primary Examiner*—Charles T. Jordan
*Assistant Examiner*—Theresa M. Wesson
*Attorney, Agent, or Firm*—Leonard Tachner

[57] ABSTRACT

The non-lethal TASER® Area Denial Device (TADD) can be deployed to prevent enemy reconnaissance troops or small raiding parties from penetrating lines and for their capture. The inventive device comprises a non-lethal alternative to the anti-personnel landmine. The TASER® alternative uses electronic stun capability in combination with a landmine housing and deployment system. This invention comprises improvements which address the issue of deployment. Regardless of which of the two flat sides of the device is in the up position, it provides the ability to launch the proper set of wires at an upward angle to intercept the subject when the target subject is in the correct position. It also simultaneously establishes a ground wire connection and prevents the second (downward facing) unusable set of wires from loading or short circuiting. The possibility of the device landing on the radius edge is eliminated by shaping the housing to make it unstable on that plane. The device will fall over onto one of two flat stable surfaces irrespective of where it initially impacts the ground. Grounding of unusable wires is prevented by a slidable shutter or gate which blocks launch of one of the lower set wires even when the device senses an intrusion into its trip space. The shutter or gate is gravity sensitive and automatically settles into a blocking position as soon as the device comes to rest.

6 Claims, 2 Drawing Sheets

TOP VIEW

SIDE VIEW

AUTOMATIC AIMING NON-LETHAL AREA DENIAL DEVICE

RELATION TO CORRESPONDING APPLICATIONS

This application is a continuation-in-part of prior application Ser. No. 08/991,268 filed Dec. 16, 1997 and still pending.

FIELD OF THE INVENTION

The present invention relates generally to the field of non-lethal area denial devices for use in military applications. The invention relates more specifically to mine-like devices employing high voltage projectiles to temporarily disable personnel in a predetermined region and to deployment of such devices in large numbers by launchers, aircraft drops and the like.

BACKGROUND ART

These non-lethal, force protection munitions, could be dispersed in volume by various mortar like devices such as the "Volcano" canisters in current military use, or the devices may be dropped from aircraft. This presents some unique challenges in that the device when launched will tumble, spin, bounce and roll, depending on the ballistics and the type and characteristics of the landing site. Its final resting position can not be predicted due to the multitude of variables.

The device uses TASER® technology to incapacitate at distances over 3 feet by firing one or more high voltage wire leads at a subject. It incapacitates the subject by overriding the brain's motor control signals by passing a very low power pulse current through nerves and muscles between either two high voltage wires or one wire and earth. The wires attach to the subject by barbs, burrs, darts or adhesives. If another live wire or wires attached to the same circuit should miss and fall to earth, this would load down or short circuit the Taser circuit making the wires attached to the subject ineffective.

There must be a method to sense when the subject is within range and in line with the wire trajectory. Also the wire or wires must be fired at an upward angle to hit in an area more than one foot and less than six feet above the ground. It is also desirable to establish an electrical earth connection so that the option to incapacitate between the two wires or from one wire to earth is available.

This permits incapacitation of the subject even when the Area Denial Device is tilted so far that only one dart can hit the target. This would also enable the disablement of crawling or crouching troops.

SUMMARY OF THE INVENTION

The present invention employs the well proven non-lethal TASER® weapon and configures it as a non-lethal area denial device, similar to a anti-personnel mine, with multiple independent standoff incapacitation devices that can temporarily incapacitate a subject without injury when activated by sensors. The TASER® device has been proven safe by 18 years of use by over 400 law enforcement agencies and by many studies, including one by the Medical Director of the U.S. Consumer Products Safety Commission. The TASER® alternative to the landmine will not cause deaths or injuries if accidentally actuated by friendly forces or innocent civilians.

This non-lethal TASER® Area Denial Device (TADD) can be deployed to prevent enemy reconnaissance troops or small raiding parties from penetrating lines. In the event of a mass attack, the TASER® devices will incapacitate many of the forward line of the enemy (and any enemy troops that touch the incapacitated troops). The TASER® devices also instill strong fear into any remaining troops due to the human's inherent fear of electricity. This will give "ready troops" time to respond and even counterattack without resistance by the enemy's front line troops. The non-lethal TASER® Area Denial Device can also be deployed to keep opposing forces within their assigned areas to prevent conflicts using minimal forces. The TASER® devices may also be used to prevent subjects from following forces when they are withdrawing from an area.

The inventive device comprises a non-lethal alternative to the anti-personnel landmine. The TASER® alternative uses electronic stun capability in combination with a landmine housing and deployment system. The device can cover a radius of 15 feet (30 feet possible) and can be triggered by various sensors. Although the TASER® device would cause no deaths or injuries if accidentally triggered by friendly forces.

This invention comprises improvements which address the issue of deployment. Regardless of which of the two flat sides of the device is in the up position, it provides the ability to launch the proper set of wires at an upward angle to intercept the subject when the target subject is in the correct position. It also simultaneously establishes a ground wire connection and prevents the second (downward facing) unusable set of wires from loading or short circuiting. The possibility of the device landing on the radius edge is eliminated by shaping the housing to make it unstable on that plane. The device will fall over onto one of two flat stable surfaces irrespective of where it initially impacts the ground. Grounding of one of the unusable wires is prevented by a slidable shutter or gate which blocks launch of one of the lower set wires even when the device senses an intrusion into its trip space. The shutter or gate is gravity sensitive and automatically settles into a blocking position as soon as the device comes to rest.

OBJECTS OF THE INVENTION

It is therefore a principal object of the present invention to provide an area denial device using non-lethal high voltage projectile which may be appropriately launched toward sensed personnel irrespective of the orientation in which the device has been positioned.

It is another object of the invention to provide a TASER® area denial device having two sets of launchable darts to accommodate either of two opposed orientations of the device.

It is still another object of the invention to provide a dispersible TASER® area denial device having two sets of launchable electrodes and a gravity controlled shutter for blocking an electrode of one such set to prevent inadvertent electrical shorting while permitting effective operation in either of two device orientations.

It is yet another object of the invention to provide a TASER® area denial device which is effective to temporarily disable nearby personnel, irrespective of the orientation of the device after it has been launched or dropped by a system for dispersing a large plurality of such devices in a short period of time.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
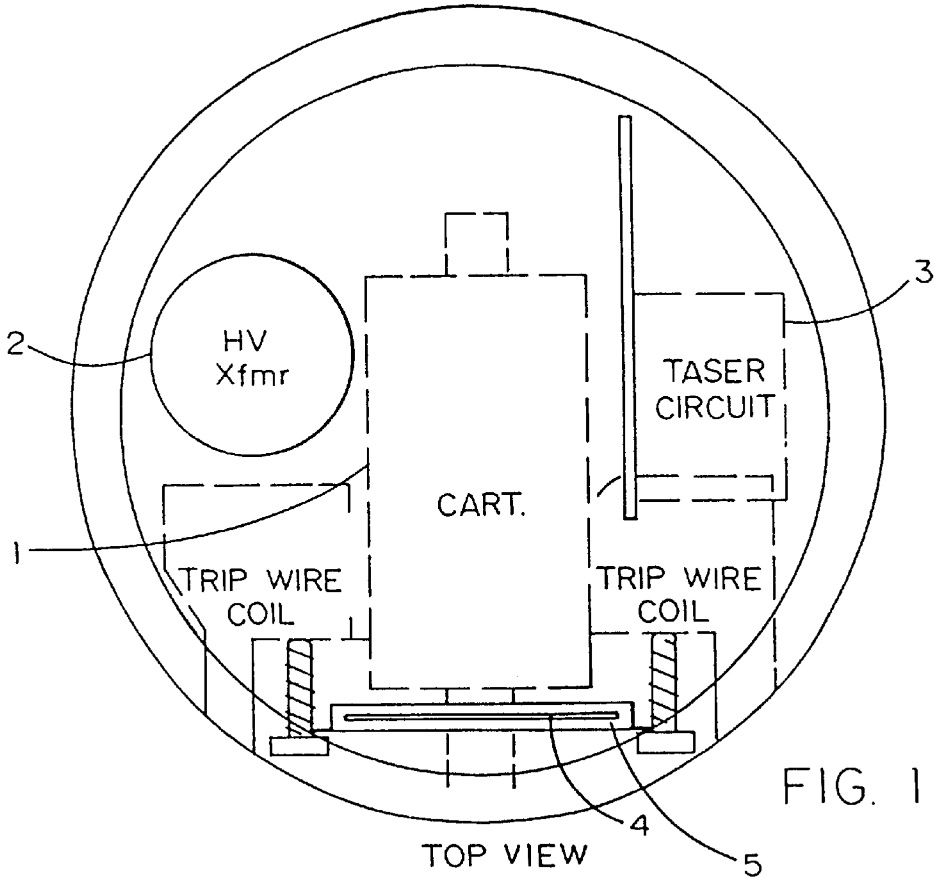
FIG. 1 is a top view of the invention.
Figure 2:
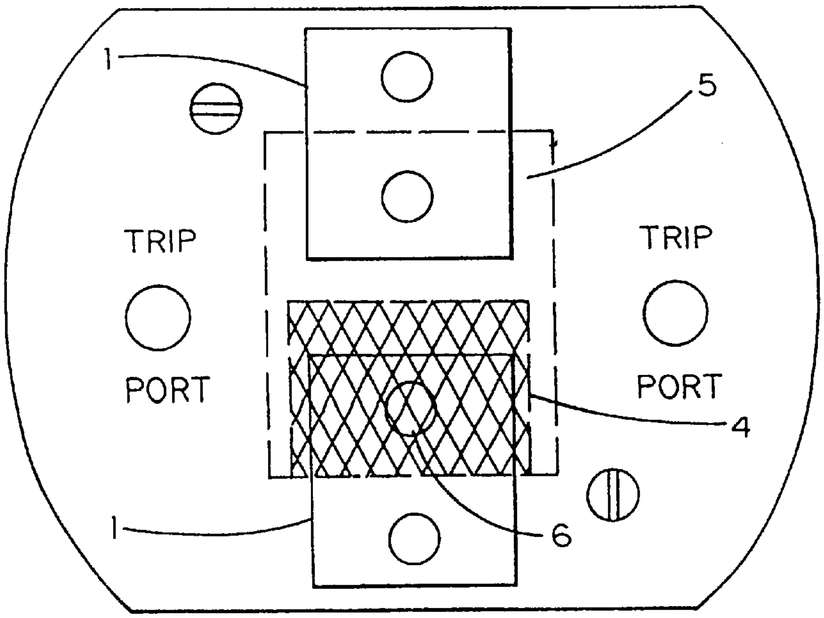
FIG. 2 is a front view.
Figure 3:
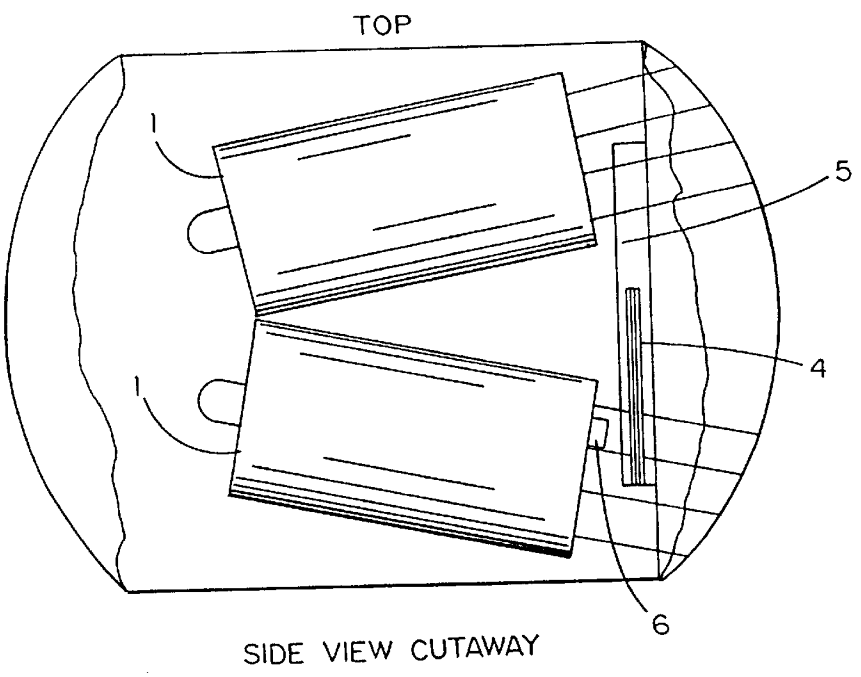
FIG. 3 is a side view.
Figure 4:
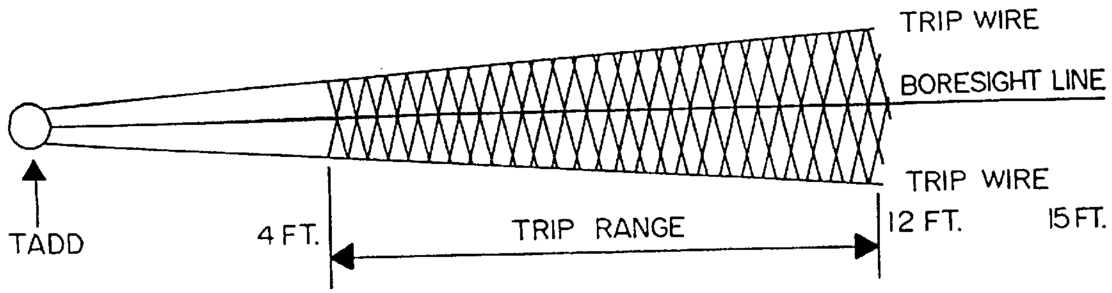
FIG. 4 is a schematic drawing of trip range in a preferred embodiment.

Reference will be made to the accompanying FIGS. 1–4. The invention utilizes two TASER® cartridges (1) connected to a high voltage transformer (2) from a single Taser circuit (3). Each cartridge is aimed at a small angle toward its respective flat mounting surface so that one cartridge is always aimed upward and one always downward.

A hard, non-conductive, gravity drop shutter or blocking device (4) is installed in a centrally located cavity (5) in the housing or in the cartridge bay cover. The cavity is cut or molded to be slightly wider than the width of the shutter and slightly deeper than the shutter thickness so the shutter can move freely. The shutter always drops downward and blocks the upper wire dart (6) of the downwardly aimed lower cartridge. This prevents the two darts of the downward pair from both ejecting and short circuiting to each other or to earth (ground).

The lower dart of this lower cartridge (which electrically connects to the upper dart of the upper cartridge) is not blocked and is fired into the earth establishing the earth or ground connection for the TASER® circuit. This assures incapacitating an individual between the upper dart and the lower dart of the upper cartridge or between the lower dart and earth or ground.

When the Area Denial Device is turned upside down, the positions and the functions of the two cartridges reverse as the gravity drop shutter drops to its new position.

A trip wire reel and cartridge ejects one or more trip wires of optimum range length. The trip wires must not be activated within 4 feet of the device housing. This assures that subjects crossing the firing line or crossing over the device from the side opposite the firing line, will not be hit at too close a range to be effective. One or more trip wires may be ejected on either side of the cartridges, along the boresight firing line. This assures that the subject is in proper position to be incapacitated.

These improvements permit the device to accurately target and incapacitate a subject regardless of the rotation position, the tilt of the device or whether the device is right side up or upside down.

Having thus described a preferred embodiment for purposes of illustration, it being understood that other configurations, commensurate with the pending claims, are also contemplated herein, what is claimed is:

1. A non-lethal anti-personnel device for sensing nearby personnel and automatically firing a plurality of electrical discharge darts at such personnel for temporarily disabling the personnel; the device comprising:

a housing having a firing bay, said bay having at least two sets of darts for selectively being propelled in a predetermined direction;

a high-voltage transformer, said transformer being electrically connected to the darts by wires to which the darts remain connected after firing;

means for sensing nearby personnel and activating said firing bay for firing said darts and applying a high-voltage discharge to disable the nearby personnel; and an automatically activated blocking device for preventing at least one dart from being propelled depending upon the orientation of said device.

2. The device recited in claim 1 wherein said housing is shaped as a cylinder having a height which is less than its diameter, said cylinder having a radial surface shaped to be an unstable surface which orients said cylinder onto one of its ends.

3. The device recited in claim 1 wherein said blocking device comprises a slidable shutter which is activated by gravity.

4. The device recited in claim 1 wherein said firing bay comprises two cartridges each containing two of the said darts.

5. The device recited in claim 4 wherein each of the two darts in each cartridge is configured to be fired at different elevation angle relative to said housing.

6. The device recited in claim 1 wherein said means for sensing nearby personnel comprises trip wires.

* * * * *